United States Patent [19]

Byers

[11] Patent Number: 4,541,294

[45] Date of Patent: Sep. 17, 1985

[54] DRIVE ASSEMBLY FOR AN ASTRONOMICAL TELESCOPE

[76] Inventor: Edward R. Byers, 29001 West Highway 58, Barstow, Calif. 92311

[21] Appl. No.: 492,647

[22] Filed: May 9, 1983

[51] Int. Cl.⁴ .................... F16H 1/16; F16H 55/24
[52] U.S. Cl. .................... 74/89.14; 74/409; 74/421 A; 74/425; 74/625; 350/568
[58] Field of Search ............ 74/89.14, 383, 409, 74/425, 421 A, 606 R, 625; 350/568; 353/3

[56] References Cited

U.S. PATENT DOCUMENTS

| | | | |
|---|---|---|---|
| 1,118,564 | 11/1914 | Lupton | 350/568 |
| 1,739,616 | 12/1929 | Schroeder | 74/606 R |
| 2,582,690 | 1/1952 | Franz | 74/409 |
| 3,202,015 | 8/1965 | Moul | 74/425 |
| 3,434,366 | 3/1969 | Raso | 74/421 A |
| 3,690,194 | 9/1972 | Edwards | 74/409 |
| 3,951,511 | 4/1976 | Parsons | 350/568 |
| 4,317,612 | 3/1982 | Horvath | 350/568 |
| 4,372,180 | 2/1983 | Bollinger | 74/421 A |
| 4,400,066 | 8/1983 | Byers | 350/568 |

FOREIGN PATENT DOCUMENTS

| | | | |
|---|---|---|---|
| 2619989 | 11/1976 | Fed. Rep. of Germany | 74/89.14 |
| 727325 | 3/1955 | United Kingdom | 74/421 A |
| 2060445 | 5/1981 | United Kingdom | 74/89.15 |

Primary Examiner—Lawrence J. Staab
Attorney, Agent, or Firm—Keith D. Beecher

[57] ABSTRACT

An extremely accurate and inexpensive true sidereal rate drive assembly for an astronomical telescope, the telescope including a base having a driven gear rotatable about the polar axis of the telescope, and the drive assembly including a housing mounted on one side of the base, a single low speed synchronous drive motor mounted in the housing, and a worm gear mounted on the drive shaft of the motor for directly coupling the motor to the driven gear. In addition, a thumbwheel may be provided which is coupled to the motor shaft through appropriate reduction gearing, and which serves as a fine adjustment control for the telescope.

5 Claims, 4 Drawing Figures

DRIVE ASSEMBLY FOR AN ASTRONOMICAL TELESCOPE

BACKGROUND OF THE INVENTION

There are many instances in the use of telescopes in which it is necessary or desirable to rotate the telescope about its polar axis at a constant rate. For example, because of the rotation of the earth, it is necessary to rotate an astronomical telescope about its polar axis at a constant rate of one revolution per day when making long time studies and photographs of celestial bodies.

A variety of mounting systems for astronomical telescopes have been devised. One of the most common astronomical telescope mounting system is known as the equatorial mount. The equatorial mount embodies a two-axes gimbel system having an inclined rotation axis which parallels the earth's rotational axis, and having a second horizontal rotational axis which intersects the inclined axis at right angles to a vertical plane containing the latter axis. The inclined axis is referred to as the polar axis of the telescope, and the horizontal axis is referred to as the declination axis. Rotation of the mounting unit about the declination axis adjusts the elevation angle of the telescope to correspond to the latitude at which the telescope is used. Rotation of the mounting unit about the polar axis moves the telescope in a rotary tracking motion.

An important objective of the present invention is to provide an improved, simple and inexpensive astronomical telescope drive assembly by which an astronomical telescope is rotated with extreme accuracy about the polar axis at a desired rate by a single low speed synchronous motor which is coupled directly through a worm gear on its shaft to a driven gear within the base of the telescope, the driven gear being coaxial with the polar axis.

The technique described in the preceding paragraph permits high precision accuracy to be achieved between the drive motor and the driven gear since it eliminates two potential sources of tracking error of the two reduction gears used in the prior art units. The technique also results in the elimination of the expense of the two reduction gears.

DETAILED DESCRIPTION OF THE ILLUSTRATED EMBODIMENT

Figure 1:
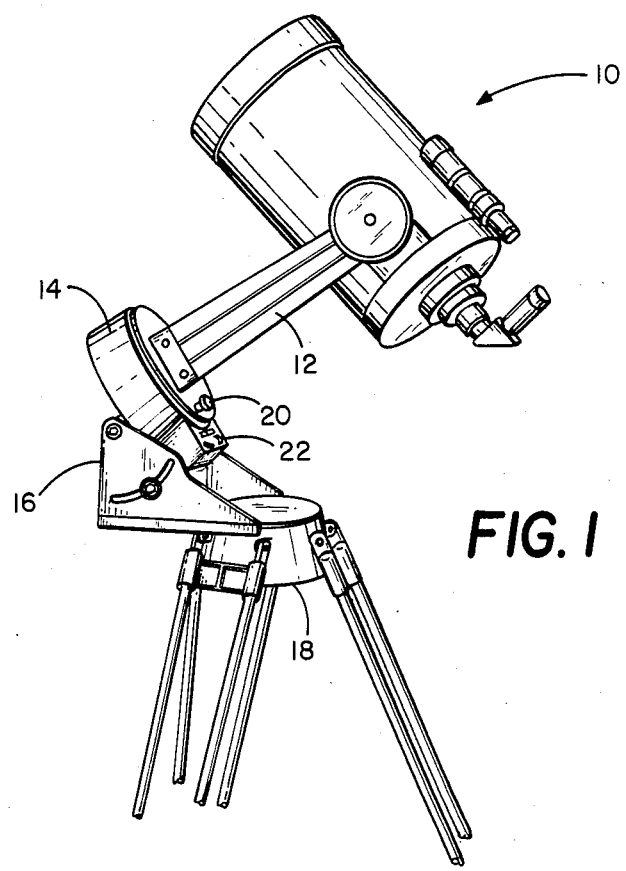
FIG. 1 is a perspective view of a typical fork-type astronomical telescope which incorporates the drive assembly of the present invention.

The telescope shown in FIG. 1 is designated generally as 10, and it includes a fork 12 which is mounted on a drive base 14. As mentioned above, the drive assembly of the invention is mounted on the base 14. Base 14 is, in turn, mounted on a wedge 16, and the wedge is mounted on a tripod 18. The assembly includes a usual right ascension control knob 20 mounted on the base.

Figure 2:
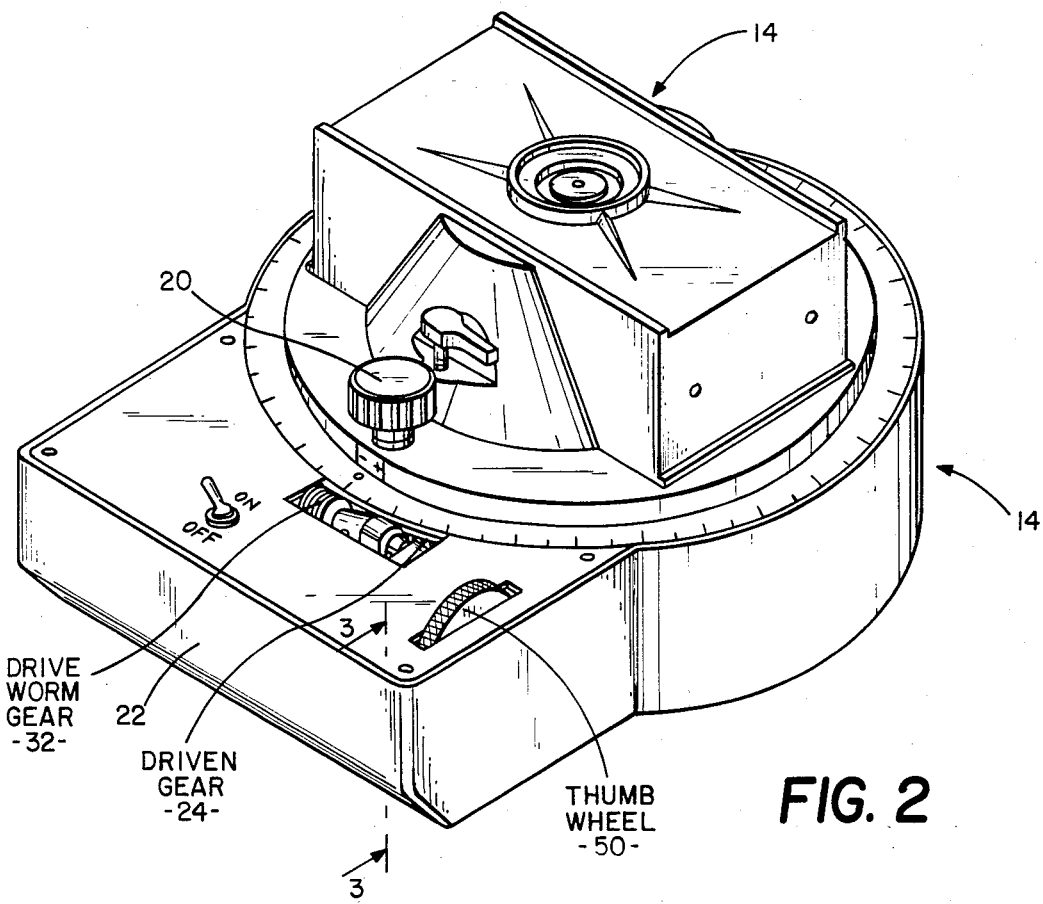
FIG. 2 is a perspective representation of the drive assembly representing one embodiment of the invention.
Figure 3:
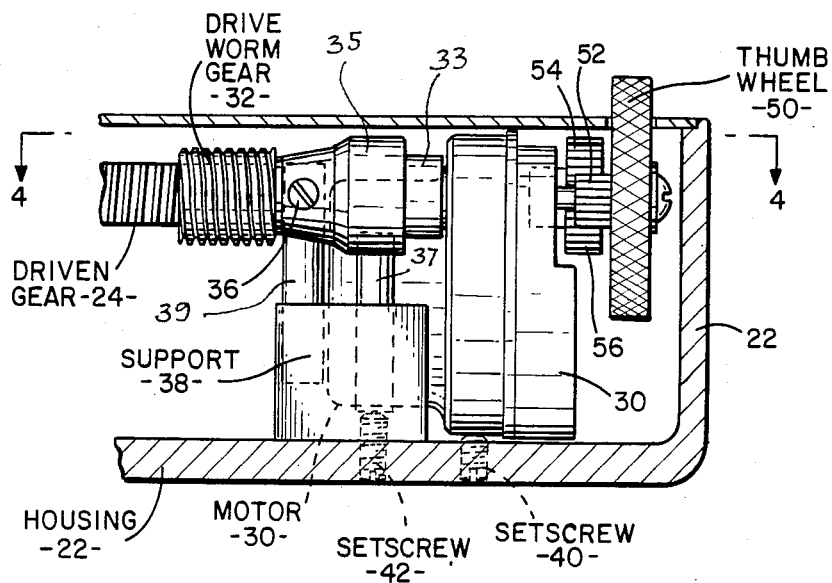
FIG. 3 is a fragmentary section of the assembly of FIG. 2 taken essentially along the lines 3—3 of FIG. 2.
Figure 4:
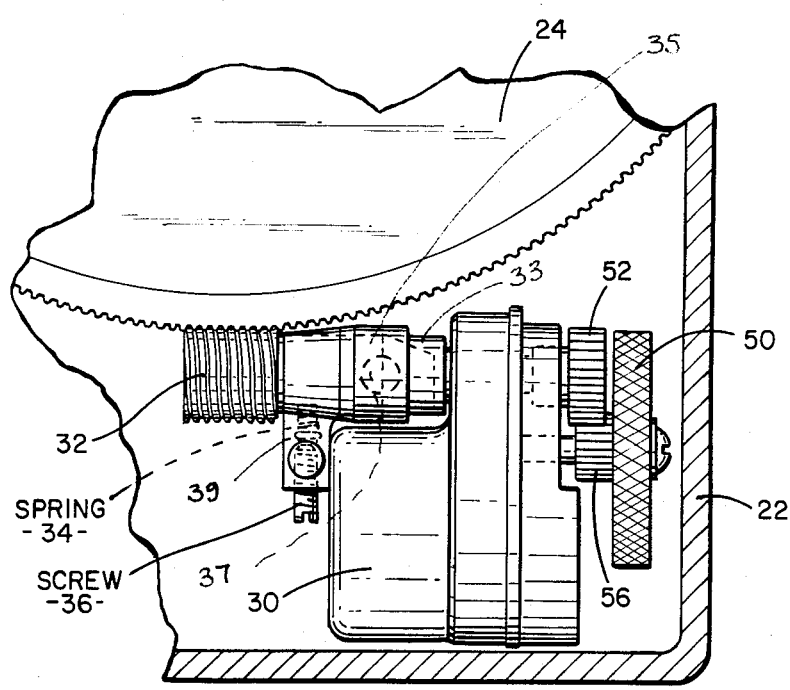
FIG. 4 is a top view of the section of FIG. 3 taken along the line 4—4 of FIG. 3.

As best shown in FIGS. 2, 3 and 4, a housing 22 is mounted on one side of the base adjacent to a concave-throated driven gear 24. Driven gear 24 is mounted in the base coaxial with the polar axis of the telescope, and when the driven gear 24 is rotated, the fork 12 is caused to rotate about the polar axis.

A drive motor 30 is located within housing 22. A drive worm gear 32 has its shaft 33 coaxially mounted on the drive shaft of motor 30. This is achieved by inserting the drive shaft of the motor into a bore at the end of the shaft 33. The motor drive shaft is held securely in the bore by a light press fit. The shaft 33 is rotatably supported in a bearing housing 35 which, in turn, is mounted on a dowel pin 37 the top of which extends into a depression in the gear housing and which is slip-fitted into a mounting hole in a support 38. Support 38 is mounted on the bottom of housing 22. The dowel pin 37 supports the bearing housing 35 which, in turn, supports the shaft 33 of worm 32 and the shaft of motor 30, with the entire sub-assembly being angularly movable to a limited extent about the axis of dowel pin 37.

Motor 30 is supported by its own shaft, thus eliminating the need for an external motor mounting bracket. The bore in the worm shaft 33 is drilled concentrically with the axis of rotation of the worm shaft, so that the motor drive shaft is automatically precisely aligned with the axis of rotation of the worm 32.

This is unlike the prior art structures in which the motor is mounted on a separate mounting bracket which creates misalignments in the drive system. The construction described above eliminates any possibility of misalignment because the motor is allowed to "float". An appropriate stop is provided to prevent rotation of the motor itself.

An up-down adjustment of the dowel pin 37 in support 38, and thus of the worm gear 42 is achieved by adjusting set screw 42. This provides easy alignment of the worm gear 42 with the concave-throated gear 24.

The worm gear 32 is biased about the axis of dowel pin 37 into engagement with the driven gear 24 by a spring 34 which bears against the bearing housing 35, the force of the spring being adjustable by a set screw 36. The spring 34 and set screw 36 are mounted on an upright post 39 which extends into a passage in support 38. Spring 34 and set screw 36 are capable of biasing the drive worm gear 32 about the axis of dowel pin 37 into engagement with the driven gear 24 with desired pressure to prevent backlash by biasing bearing housing 35 about the axis of dowel pin 37. The vertical position of the motor 30 may be adjusted by a set screw 40.

Motor 30 may, for example, be a one-quarter RPM synchronous motor, and the direct coupling of the shaft of this motor to the worm gear 32 simplifies the drive assembly as compared with the prior art units, since it eliminates the need for a separate motor mounting bracket and two reduction spur gears which are used in the prior art unit. This results in the elimination of two potential sources of tracking errors.

A thumbwheel 50 is rotatably mounted in housing 22, and, as best shown in FIG. 3, is accessible from the exterior of the housing. The thumbwheel is coupled to the drive shaft of the motor 30 through its gear 52, and through spur gears 54 and 56 which serve as reduction gears. The thumbwheel 50 serves as a fine adjustment control in right ascension. Motor 30 is available with a double shaft, and the right-hand end of the shaft is driven by a 4:1 spur gear reduction provided by the gears 54 and 56. The spur gears and thumbwheel may be made of any appropriate plastic material, for example, since they are not related in any way to the tracking accuracy of the driving system.

During normal operation of the assembly, the thumbwheel 50 is rotating at one RPM and it may operate as a built-in timer. For this purpose, the thumbwheel may be stamped with calibrations by which 360°=60 seconds. A pin may be mounted on the thumbwheel to trip another pin on an inexpensive Veder-root indicator, clicking off one minute increments for each rotation of the thumbwheel.

The invention provides, therefore, a simple and inexpensive drive for an astronomical telescope, yet one which is extremely accurate in its operation. The assembly of the invention is economical in its manufacture; it is easy to install and adjust; and it is compact for space-saving efficiency. A feature of the drive of the present invention is that the drive assembly and the associated base of FIG. 2 may easily be incorporated into existing astronomical telescopes without the necessity of the exercise of any particular skill.

It will be appreciated that while a particular embodiment of the invention has been shown and described, modifications may be made. It is intended in the claims to cover all modifications which come within the spirit and scope of the invention.

What is claimed is:

1. The combination of a drive base for rotating an astronomical telescope about its polar axis and including a driven gear mounted on the base coaxially with the polar axis; a support means mounted on one side of said base adjacent to said driven gear; a drive motor having a drive shaft; a bearing housing; a worm gear having a shaft rotatably mounted in said bearing housing in coaxial relationship with said drive shaft of said drive motor and coupled to said drive shaft to be driven thereby; a dowel pin mounted in said support means and engaging said bearing housing to support said motor and worm gear to permit angular movement of said motor and worm gear about the longitudinal axis of said dowel pin with said motor being supported in a floating manner by said drive shaft; and resilient means mounted on said support means and engaging said bearing housing for biasing said worm gear about the axis of said dowel pin into engagement with said driven gear.

2. The combination defined in claim 1, in which one of the shafts has a longitudinally extending concentric bore at one end thereof to receive the other shaft in a press-fit relationship.

3. The combination defined in claim 1, and which includes a manually operable member rotatably mounted in said housing, and reduction gear means coupling said manually operable member to said drive shaft.

4. The combination defined in claim 1, in which said manually operable member is in the form of a thumbwheel accessible from the exterior of said housing.

5. The combination defined in claim 1, in which said dowel pin is slidable in said support means, and which includes a set screw extending into said support means to set the longitudinal position of said dowel pin to adjust the worm gear relative to the driven gear.

* * * * *